(12) United States Patent
Lorca Hernando (10) Patent No.: US 9,742,524 B2
(45) Date of Patent: Aug. 22, 2017

(54) METHOD AND TRANSMITTER FOR CHANNEL CODING AND MODULATION IN THE FREQUENCY DOMAIN OF ORTHOGONAL FREQUENCY-DIVISION MULTIPLEXING WIRELESS NETWORKS

(71) Applicant: TELEFONICA, S.A., Madrid (ES)

(72) Inventor: Javier Lorca Hernando, Madrid (ES)

(73) Assignee: Telefonica, S.A., Madrid (ES)

( * ) Notice: Subject to any disclaimer, the term of this patent is extended or adjusted under 35 U.S.C. 154(b) by 124 days.

(21) Appl. No.: 14/709,873

(22) Filed: May 12, 2015

(65) Prior Publication Data

US 2015/0326341 A1  Nov. 12, 2015

(30) Foreign Application Priority Data

May 12, 2014  (EP) .................................... 14382166

(51) Int. Cl.
*H04L 1/00* (2006.01)
*H04L 5/00* (2006.01)
*H04L 27/20* (2006.01)

(52) U.S. Cl.
CPC .......... *H04L 1/0003* (2013.01); *H04L 1/0009* (2013.01); *H04L 1/0013* (2013.01);
(Continued)

(58) Field of Classification Search
CPC . H04L 1/0003; H04L 1/0009; H04L 27/2608; H04L 1/0041; H04L 1/0057;
(Continued)

(56) References Cited

U.S. PATENT DOCUMENTS 9,520,925 B2 * 12/2016 Lee, II ................... H04L 1/0041
2006/0268976 A1 * 11/2006 Baum ................... H04L 1/0003
375/239

(Continued)

FOREIGN PATENT DOCUMENTS

EP       2 129 159 A1   12/2009
WO    2008/109269 A2    9/2008
WO    2011/047355 A2    4/2011

OTHER PUBLICATIONS

"Comparison of DFTS-OFDMA with OFDMA", Nortel, 3GPP TSG-RAN WG1 #55, R1-084587, Prague, Czech, Nov. 10-14, 2008, 12 Pages.

(Continued)

*Primary Examiner* — Vineeta Panwalkar
(74) *Attorney, Agent, or Firm* — Sughrue Mion, PLLC (57) ABSTRACT

The method comprising: applying, by a transmitter, a Forward Error Correction to an information block to be sent to a receiver and modulating said information block prior to its transmission, wherein the transmitter has knowledge of a channel frequency response seen by the receiver and the applying and modulating are performed at a variable-rate, at the transmitter side, by: transforming the information block into a number of smaller packets denoted as codeblocks fitting the input sizes accepted by the Forward Error Correction; selecting, a set of modulation and coding schemes to be independently applied to each of the codeblocks; including, information about the selected set of modulation and coding schemes within part of physical resources devoted to user data by reserving specific subcarriers and OFDM symbols; and mapping, said information within physical resources devoted to user data and not reserved for (Continued)

said selected set of modulation and coding schemes, first in order of ascending OFDM symbols and then of ascending subcarriers.

14 Claims, 10 Drawing Sheets

(52) U.S. Cl.
CPC .......... *H04L 1/0025* (2013.01); *H04L 1/0029* (2013.01); *H04L 1/0041* (2013.01); *H04L 5/0007* (2013.01); *H04L 5/0044* (2013.01); *H04L 27/20* (2013.01); *H04L 5/0046* (2013.01)

(58) Field of Classification Search
CPC . H04L 27/2626; H04B 7/0632; H04B 7/0456; H04N 21/6373
See application file for complete search history.

(56) References Cited

U.S. PATENT DOCUMENTS

| | | | |
|---|---|---|---|
| 2009/0232084 A1* | 9/2009 | Li .......................... | H04L 5/0007 370/330 |
| 2011/0032900 A1* | 2/2011 | Maheshwari ....... | H04W 72/042 370/329 |
| 2016/0278117 A1* | 9/2016 | Sahlin .................. | H04B 7/2615 |

OTHER PUBLICATIONS

"Adaptive modulation and channel coding rate", Samsung, 3GPP TSG-RAN WG1 LTE Ad Hoc Meeting, Tdoc R1-060076, Helsinki, Finland, Jan. 23-25, 2006, 7 Pages.
European Search Report for EP 14382166.8 dated Sep. 24, 2014.

* cited by examiner

METHOD AND TRANSMITTER FOR CHANNEL CODING AND MODULATION IN THE FREQUENCY DOMAIN OF ORTHOGONAL FREQUENCY-DIVISION MULTIPLEXING WIRELESS NETWORKS

This application claims priority from European Patent Application No. 14382166.8 filed May 12, 2014, the contents of all of which are incorporated herein by reference in their entirety.

FIELD OF THE INVENTION

The present invention generally relates to the field of efficient channel coding and modulation with large system bandwidths. In particular, the invention relates to a method and to a transmitter for channel coding and modulation in the frequency domain of Orthogonal Frequency-Division Multiplexing wireless networks.

BACKGROUND OF THE INVENTION

Orthogonal Frequency-Division Multiplexing (OFDM) is a proven access technique for efficient user and data multiplexing in the frequency domain. One example of a system employing OFDM is Long-Term Evolution (LTE). LTE is the next step in cellular Third-Generation (3G) systems, which represents basically an evolution of previous mobile communications standards such as Universal Mobile Telecommunication System (UMTS) and Global System for Mobile Communications (GSM). It is a Third Generation Partnership Project (3GPP) standard that provides throughputs up to 50 Mbps in uplink and up to 100 Mbps in downlink. It uses scalable bandwidth from 1.4 to 20 MHz in order to suit the needs of network operators that have different bandwidth allocations. LTE is also expected to improve spectral efficiency in networks, allowing carriers to provide more data and voice services over a given bandwidth.

One of the key features in OFDM is the ability to perform frequency-selective scheduling of users, as happens in LTE. In this scheme, estimation of the channel frequency response must be performed in both uplink and downlink directions (and reported to the base station in the downlink case), so that schedulers can perform optimum allocation of resources by choosing the appropriate parts of the spectrum for each user.

To facilitate this, the base station estimates the uplink channel frequency response and additionally receives downlink channel quality reports from the users, in which an estimation of the downlink channel frequency response is included. Based on these reports the scheduler allocates resources trying to avoid parts of the spectrum with poor frequency response on a per-user basis.

However, the resource allocation procedure in prior art techniques usually assigns an overall Modulation and Coding Scheme (MCS) to the whole transmission (independently for each code-word in case of employing multiple spatial streams), according to the overall perceived channel quality. This MCS determines the modulation and coding rate to be applied to the whole information packet, with greater redundancy and lower-order modulations when experiencing poorer channel responses (and vice versa). If the bandwidth reserved for a single user is much greater than the channel coherence bandwidth, then the channel will exhibit significant fluctuations in frequency along the scheduled resources. In that case the MCS will have to be fitted to the average channel conditions rather than to the detailed frequency response as reported by the mobile users.

With the use of ever higher frequency bands, the trend in future cellular systems is to extend the usable system bandwidth up to several hundreds of MHz, as foreseen for the Fifth Generation of mobile communications (5G). Such large bandwidths will translate into similarly large bandwidth allocations for the users, especially in small cells with good radio conditions.

Figure 1:
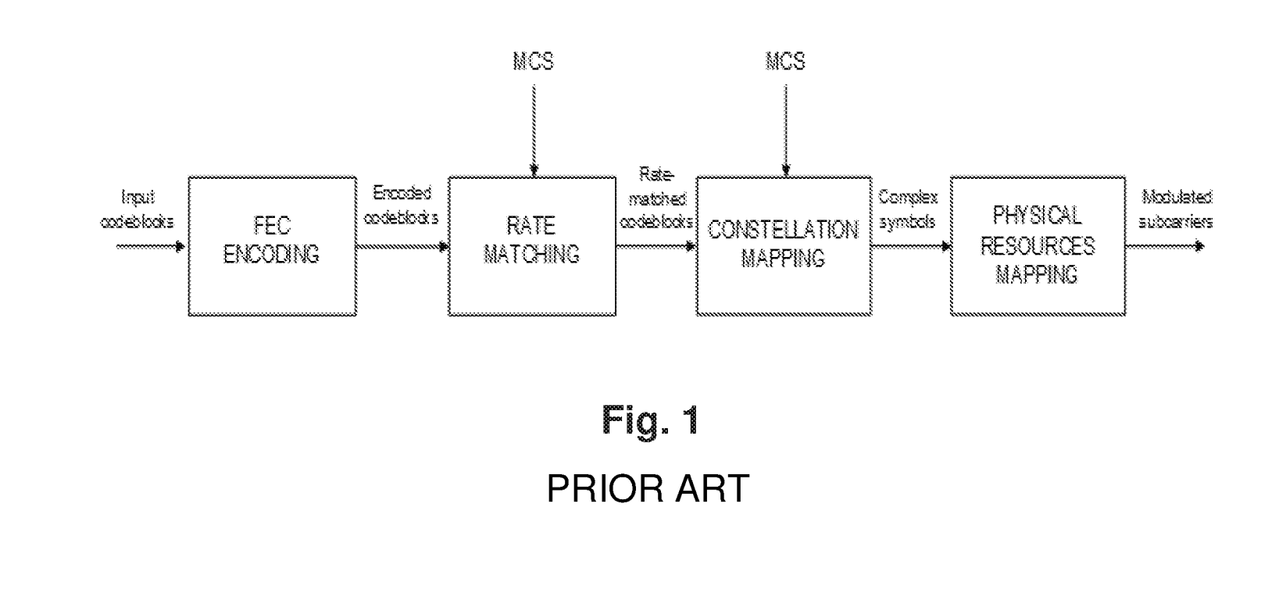
FIG. 1 illustrates an encoding and modulation process according to prior art techniques.

An example of a simplified procedure for channel encoding and modulation used in prior art techniques is illustrated in FIG. 1. Essentially, the information passes through a Forward Error Correction (FEC) encoder where redundancy is added to the original data for protection against channel impairments. Depending on the FEC code, and in order to adapt the physical block lengths to the available block sizes accepted by the FEC encoder, the input data may optionally enter in the form of a number of smaller blocks, denoted as "codeblocks". The FEC Encoder accepts each of these codeblocks as inputs and performs forward error correction to each of them with a fixed coding rate (usually ½ or ⅓, depending on the system). An optional Rate Matching function then accepts the encoded blocks and matches their sizes to the available physical resources according to the chosen MCS, thereby applying a common overall coding rate. The rate-matched codeblocks enter a Constellation Mapping function, where bits are transformed into complex symbols according to the modulation scheme given also by the MCS. These symbols are mapped to physical resources in a Physical Resources Mapping function, thus resulting in a number of modulated subcarriers that comprise the OFDM signal in the frequency domain.

It must be noted that the operation of transforming the input data into smaller codeblocks is not essential in prior art techniques, as the FEC encoding operation can be directly applied to the input block in some encoding schemes. This may happen e.g. when the sizes of the input data blocks are fixed in the system, or when the performance of the FEC encoder does not change significantly over the range of input sizes foreseen in the system. The same happens with the Rate Matching function, as it is only intended to adapt the variable input sizes to the available physical resources when there is a significant variability in any of them. The examples and figures in the proposed invention are only included for ease of explanation, but are not intended to restrict the applicability of the proposed ideas as will be explained in following sections.

Problems with existing solutions are that the demand for wider bandwidths aggravates the effect of frequency-selective radio channels, especially in outdoors where the coherence bandwidth is usually much smaller than the system bandwidth because of the large delay spread of the channel.

Traditional solutions to cope with small coherence bandwidths involve reserving only part of the spectrum for resources allocation in order to avoid nulls in the channel. In current LTE macro deployments this solution fits well with the user expectations, as users are unlikely to demand very large bit rates for high-quality services and thus are not allocated large portions of the spectrum. However when using large system bandwidths, and especially in small cells deployments, large bandwidth allocations can be expected for video services.

LTE base stations usually try to allocate the whole system bandwidth to the active users in the cell in order to avoid under-utilization of resources. This brings significant channel variations within the scheduled resources that should be tracked by the encoding and modulation scheme. The MCS will suit the average channel conditions along the allocated spectrum rather than the instantaneous frequency response. This effect reduces the effectiveness of the coding scheme and its resilience against multipath.

Apart from that, current resource mapping procedures in some technologies (like e.g. LTE) do not allow differentiated channel coding and modulation for each of the blocks comprising a given packet, because each block is spread along the scheduled bandwidth and thus cannot be given a separate MCS but rather an average one.

More specific solutions for efficient modulation and coding schemes are therefore needed when deploying large system bandwidths in OFDM under frequency-selective radio channels.

SUMMARY OF THE INVENTION

The present invention proposes a change in prior art channel encoding/decoding and modulation techniques in wireless OFDM systems in order to increase the link adaptation to frequency-selective radio channels, especially suitable for large system bandwidths and low-mobility situations.

To that end, in accordance with a first aspect there is provided a method for channel coding and modulation in the frequency domain of Orthogonal Frequency-Division Multiplexing wireless networks comprising, as commonly in the field: a) applying, by a transmitter, a Forward Error Correction to at least one information block, or data, to be sent to a receiver; and b) modulating, by the transmitter, said at least one encoded information block prior to its transmission to said receiver, the transmitter having knowledge of a channel frequency response as seen by the receiver.

On contrary of the known proposals, in the method of the first aspect, the steps a) and b) are performed at a variable-rate by performing, at the transmitter side, the following steps: transforming the information block into a number of smaller packets denoted as codeblocks, said codeblocks fitting the input sizes accepted by said Forward Error Correction; selecting a set of modulation and coding schemes to be independently applied to each of said codeblocks, said set of modulation and coding schemes comprising values of the coding rates and the modulation orders that best fit the channel frequency responses as experienced by said codeblocks; including information about said selected set of modulation and coding schemes within part of physical resources devoted to user data by reserving specific subcarriers and OFDM symbols; and mapping the encoded and modulated information within the physical resources devoted to user data and not reserved for carrying said selected set of modulation and coding schemes, first in order of ascending OFDM symbols and then in order of ascending subcarriers.

According to the invention, the transmitter comprises at least one base station or a user terminal. In addition, the channel frequency response is reported from the receiver to the transmitter side in Frequency Division Duplex, FDD, mode, or directly estimated by the transmitter in Time Division Duplex, TDD, mode.

The different modulation and coding schemes to apply on each codeblock may be characterized according to the following expression: $MCS_i = MCS_{avg} + \Delta MCS_i$; where $MCS_i$ denotes the modulation and coding scheme of the i-th codeblock, $MCS_{avg}$ is the average modulation and coding scheme for the whole transmission and $\Delta MCS_i$ denotes the differential MCS values with respect to said average modulation.

The information about the selected set of modulation and coding schemes included within part of the physical resources devoted to user data may include only differential MCS values.

According to the invention, the differential MCS values may be encoded through any Forward Error Correction method, some examples may include a convolutional turbo, a turbo code, Reed-Muller, etc. Then, it is used a constellation mapping function, including at least a Binary Phase Shift Keying modulation, for modulating the encoded codeblocks and protecting them against channel impairments.

Preferably, the codeblocks have the same sizes prior to be encoded by the Forward Error Correction.

According to an embodiment, a Rate Matching function then further matches the sizes of the codeblocks after the Forward Error Correction to available physical resources adjusting the different coding rates of each of the codeblocks. Furthermore, the Rate Matching function further adjusts the sizes of the codeblocks after Forward Error Correction to reserve part of the available physical resources for carrying indications on the modulation and coding schemes to be used.

According to a second aspect there is provided a transmitter for channel coding and modulation in the frequency domain of Orthogonal Frequency-Division Multiplexing wireless networks, the transmitter, including at least one of a base station or a user terminal, having knowledge of a channel frequency response as seen by a receiver and comprising as commonly in the field: coding means to apply a Forward Error Correction to at least one information block to be sent to a receiver; and modulation means to modulate the at least one encoded information block prior to its transmission to said receiver.

On contrary of the known proposals, the transmitter also comprises: adaptation means to transform the information block into a number of smaller packets denoted as codeblocks, said codeblocks fitting the input sizes accepted by said Forward Error Correction; tuning means to select a set of modulation and coding schemes to be independently applied to each of said codeblocks; means to include information about said selected set of modulation and coding schemes within part of physical resources devoted to user data; and mapping means to map the encoded and modulated information within the physical resources devoted to user data and not reserved for carrying said selected set of modulation and coding schemes, first in order of ascending OFDM symbols and then in order of ascending subcarriers.

The transmitter of the second aspect may also include rate matching means to at least match the sizes of the codeblocks after the Forward Error Correction to available physical resources.

The subject matter described herein can be implemented in software in combination with hardware and/or firmware, or a suitable combination of them. For example, the subject matter described herein can be implemented in software executed by a processor. For instance, a computer program comprising software code adapted to perform the steps according to the method of the first aspect when said program is run on a computer, or even on a digital signal processor, a field-programmable gate array, an application-specific integrated circuit, a micro-processor, a micro-controller, or any other form of programmable hardware may be also provided by the invention.

Summarizing, the positive effect of the varying modulation and coding scheme values, or MCS, will be a higher adequacy of the modulation and coding scheme to the channel conditions in the frequency domain, especially when allocating large chunks of bandwidths for user allocations. Channel variations in the frequency domain can be moderate (for values of the channel coherence bandwidth higher than the allocated bandwidth) or very significant (for values of the channel coherence bandwidth smaller than the allocated bandwidth). Therefore the MCS variations can be suitably described by positive and negative indices around the average MCS according to the maximum observed channel variations for a given user.

The suitability of the proposed variable-rate coding scheme will be higher in low-mobility conditions, where the channel coherence time is large and channel variations in the time domain are sufficiently small. Channel conditions as known at the base station will thus remain valid for the time elapsed between application of the proposed MCS variations and reception of the codeblocks by the user.

The proposed invention can be applied on a per-user basis depending on the allocated bandwidth, expected user traffic, channel conditions and degree of user mobility, in both uplink and downlink directions.

BRIEF DESCRIPTION OF THE DRAWINGS

The previous and other advantages and features will be more fully understood from the following detailed description of embodiments, with reference to the attached, which must be considered in an illustrative and non-limiting manner, in which.

DETAILED DESCRIPTION OF THE INVENTION

Figure 2:
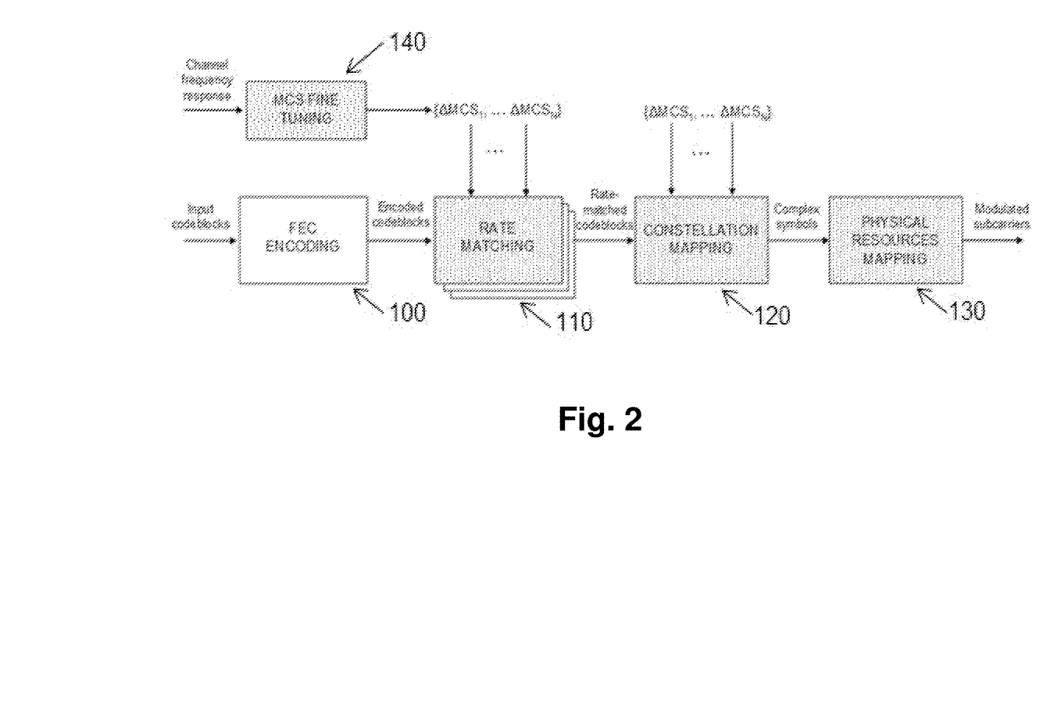
FIG. 2 illustrates the encoding and modulation process proposed in the present invention.

FIG. 2 illustrates the proposed method for variable-rate channel coding and modulation, with the modified processing blocks filled in with dots. Irrespective of whether prior art techniques partition the data into smaller codeblocks or not, this invention proposes to exploit such partitioning with a completely different intention. As seen in FIG. 2, instead of applying a fixed modulation and coding scheme to the whole block of information, different modulation and coding schemes (MCS) values will be employed for each of a series of codeblocks in which the input data are previously partitioned, with the purpose of matching them with the channel conditions in the frequency domain. These instantaneous MCS values will be obtained by tuning means 140 or MCS Fine Tuning as termed in the figure, from the available channel frequency responses.

The fine-tuned MCS values will be preferably characterized by an average MCS value, similar to the one employed in prior art techniques, plus a number of MCS variations $\Delta MCS_i$ that track the variations in the channel conditions around the average value in the frequency domain.

Channel conditions will be assumed to be known at a transmitter side via direct estimation of the received signals (in Time-Division Duplex mode, or TDD, where channel reciprocity can be assumed) or by means of channel state reports received from the users (in Frequency-Division Duplex mode, or FDD). It is not unusual that base stations in OFDM systems have detailed knowledge of the wideband channel characteristics of each of the users in order to perform frequency-selective scheduling. These channel quality indications in the frequency domain may have coarse granularity, but they usually suffice in order to know where the best regions of the spectrum are located. The same indications can be exploited for obtaining the most suitable MCS values for each of the codeblocks.

A Rate Matching means 110 then can perform rate matching of the codeblocks according to the different MCS values assigned to each of them, as opposed to prior art techniques where a single MCS is assigned to all the codeblocks. It is thus conceptually indicated in FIG. 2 as multiple blocks operating in parallel over the input codeblocks (although practical implementations may not present this parallelized structure at all). It may happen that the Rate Matching means 110 is not actually needed in practical implementations, whenever the FEC Encoding module/means 100 is able to operate at different code rates as envisioned in the system; however it is depicted for ease of reference and other possibilities are not precluded without departure from the ideas proposed in this invention.

Figure 3:
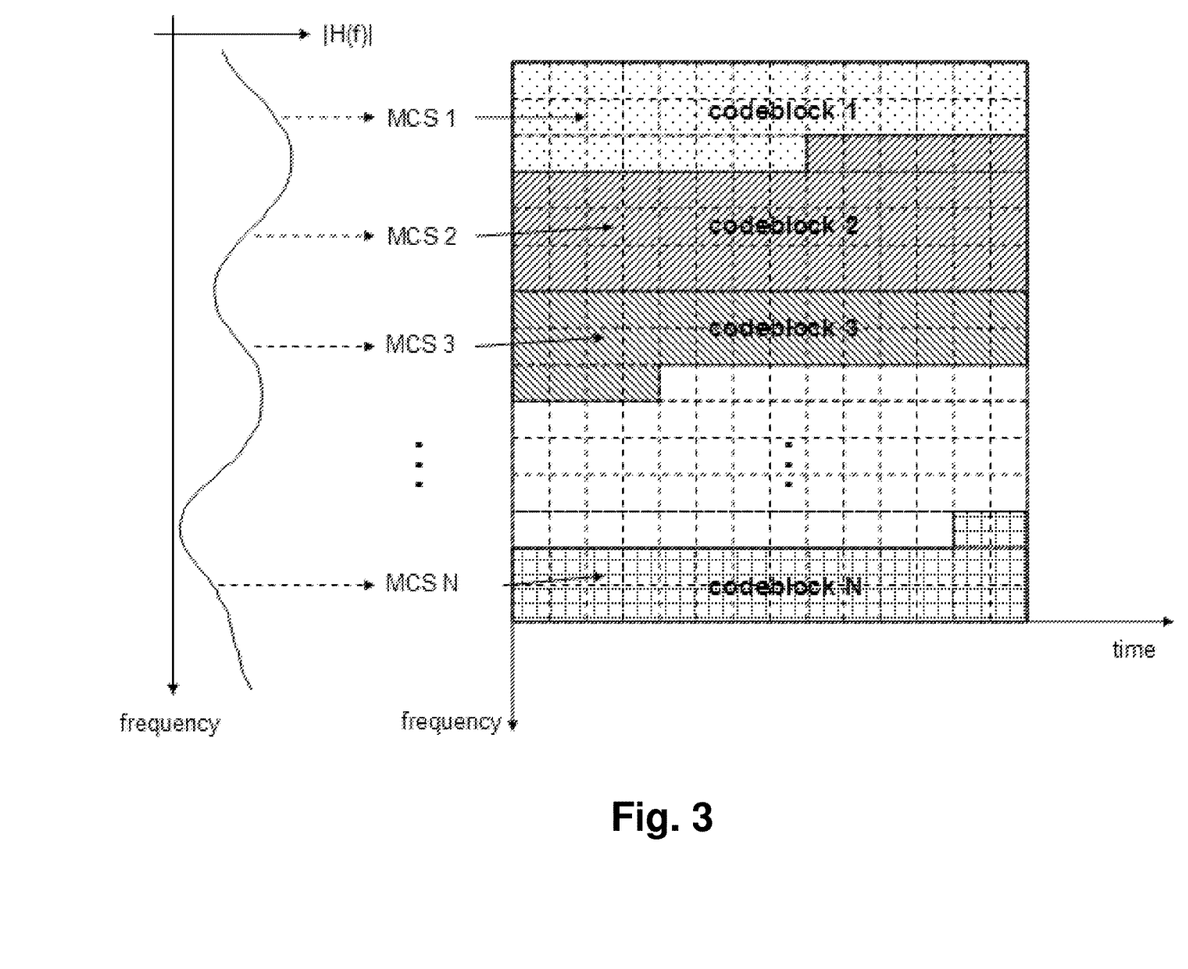
FIG. 3 illustrates the different codeblock sizes after encoding, rate matching and mapping on OFDM physical resources.

Then, a Constellation Mapping module/means 120 will transform the information into complex samples on a per-codeblock basis, eventually considering a different modulation for each of them. At that time, a mapping means or Physical Resources Mapping module 130 as termed in the figure will finally map the complex modulated signals into OFDM symbols and subcarriers, in such a way that the encoded codeblocks will undergo different modulation and coding rates according to their relative channel qualities. After Physical Resources Mapping 130 each of the encoded codeblocks will have a different length according to the actual MCS values. FIG. 3 sketches how the different codeblocks end up with different sizes after encoding even having the same lengths prior to encoding. The amplitude of the channel transfer function |H(f)| determines the MCS values corresponding to each of the blocks, yielding higher block sizes for poorer channel responses and vice versa.

The average MCS value will be signaled to the user according to any suitable prior art technique, but the MCS variations are proposed to be encoded separately across the resources allocated for user data by employing a specific encoding scheme. The reduced amount of extra signaling implied by the additional MCS variations will thus be negligible compared to the available data space, given that the proposed invention makes especial sense when allocating large bandwidths to a user. Different coding rates for each codeblock translate into different amounts of redundancy to be applied by the FEC encoder 100 processing, thereby varying the level of protection against channel impairments. If the MCS variations are adapted to the channel fluctuations then the encoding process will be better suited to the effects of the channel in the frequency domain. In addition, eventual variations in the modulation order translate also into different amounts of available information in a given time-frequency resource, by which a varying degree of channel protection can also be applied.

Figure 4:
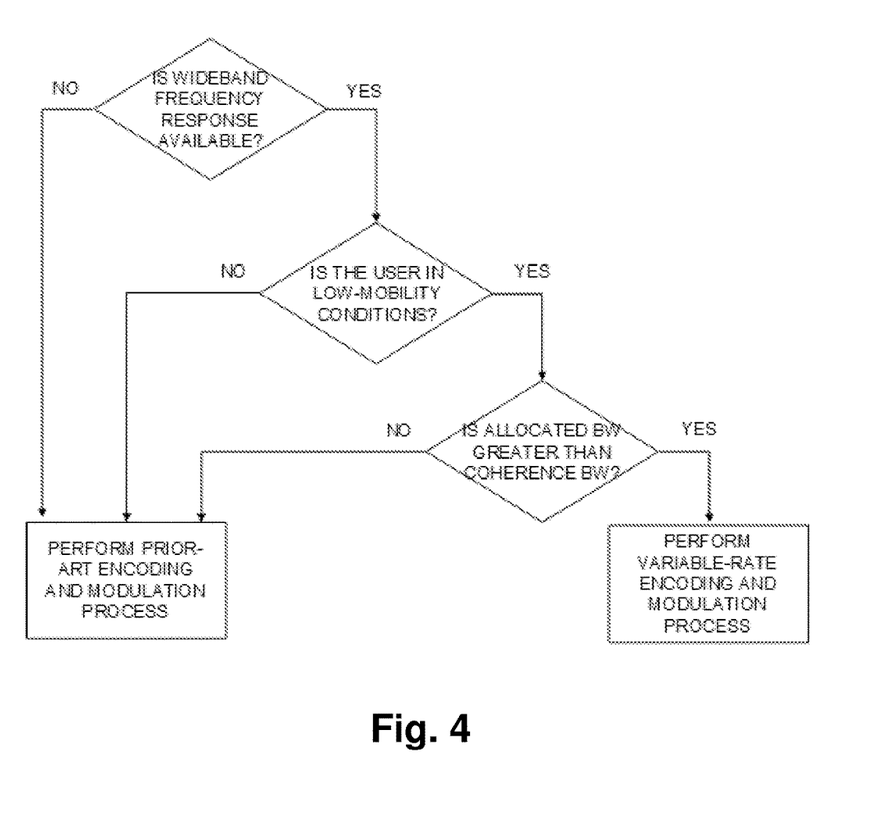
FIG. 4 is a flow chart for applicability of the invention at a transmitter including a base station.

FIG. 4 illustrates a chart containing a suitable decision process whereby a base station can decide whether or not to apply the proposed variable-rate channel coding and modulation method. From the user's amount of expected data traffic, mobility conditions and availability of the detailed channel frequency response in uplink or downlink, the scheduler will decide whether or not the proposed scheme is applied for the next transmission(s). The base station first evaluates whether wideband frequency response characteristics of the channel are available and up to date for that user. If it is not the case then the system switches to prior art encoding and modulation techniques. If they are available, the base station then evaluates the degree of user mobility. User mobility can be estimated from a number of techniques, such as the rate of variation of the channel quality indicators (as reported from the users), the number of cell reselections or handovers over a given period in time, or explicit velocity indications from the users, among others. If mobility is high it is preferable to perform prior art encoding and modulation techniques, with a common MCS value for the whole transmission. If it is low, then the base station evaluates whether the allocated bandwidth is greater than the coherence bandwidth of the channel. Again, if it is not the case the system switches to prior art techniques, on the contrary the present invention can be applied.

If the base station decides to perform the changes described in this invention then these changes can be performed both in uplink or downlink, as part of the link adaptation unit at Medium Access Control (MAC) level. Changes in transmission for the downlink direction will be performed by the base station, while changes for the uplink direction will instead be performed by the user terminal.

Figure 5:
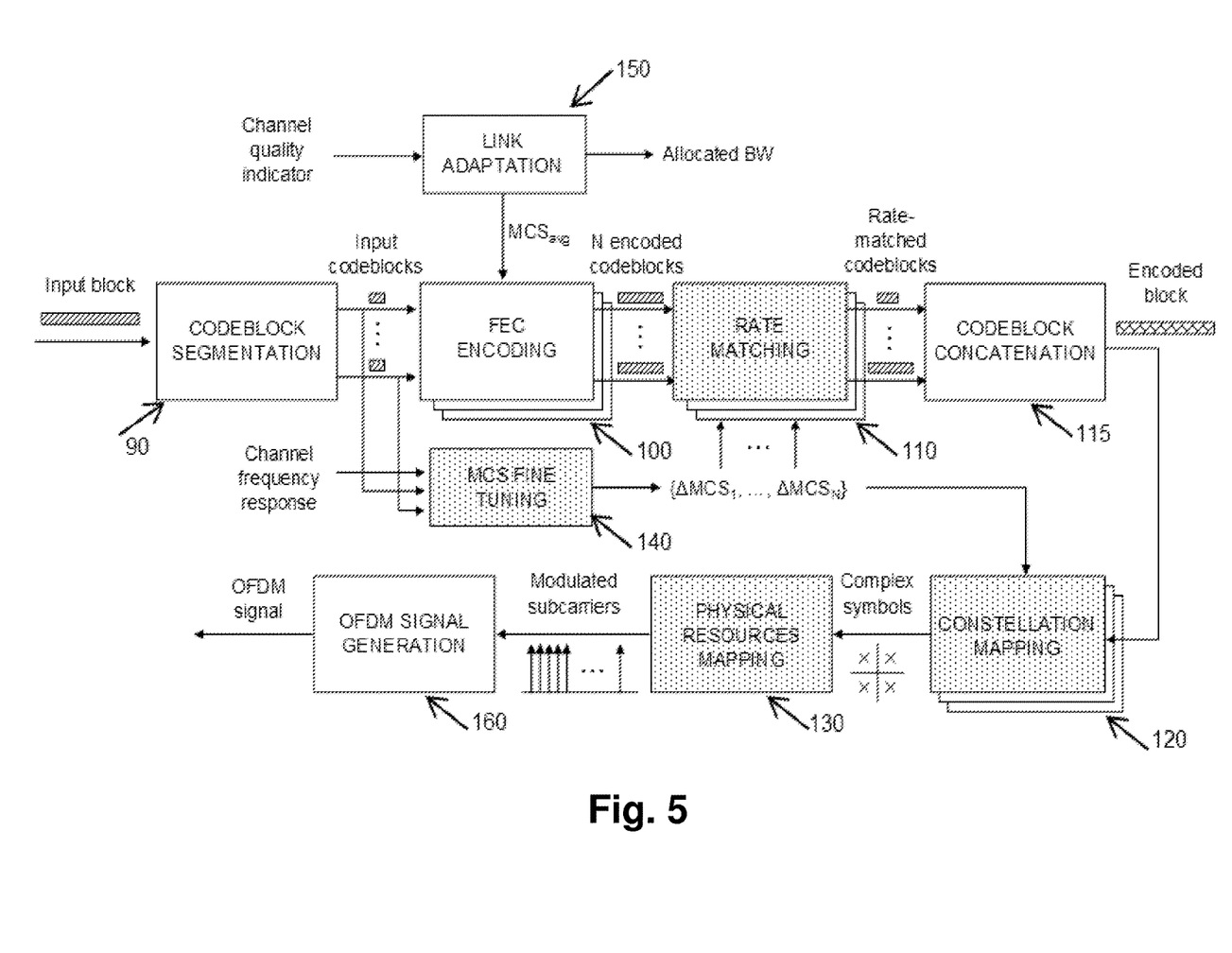
FIG. 5 illustrates the encoding and modulation processing steps showing the required changes for application of the proposed invention according to some embodiments.

Application of the proposed variable-rate encoding and modulation method implies a number of steps to be taken at the transmit side (base station or user terminal), as illustrated in FIG. 5 where blocks with substantial changes are filled with dots. According to prior art techniques, the Link Adaptation module/means 150 decides the average MCS ($MCS_{avg}$) as well as the allocated bandwidth reserved for a given user from the available channel quality indicator, and thus determines the transport block size to be used. The input/information block is segmented in the Codeblock Segmentation module/means 90 into the codeblocks that fit the available block sizes prior to the FEC encoder 100.

The MCS Fine Tuning 140 then calculates appropriate MCS variations ($\Delta MCS_i$) for each of the codeblocks that enter the FEC encoder 100 according to the detailed channel frequency response. These MCS variations will correspond to integer positive and negative values around the average MCS, with a maximum variation given by the maximum channel variation and the maximum allowed signaling overhead. The codeblocks will undergo a FEC encoding process whereby each block is encoded with a different MCS value ($MCS_i$), as given by the sum of the average MCS ($MCS_{avg}$) and the MCS variations ($\Delta MCS_i$):

$MCS_i = MCS_{avg} + \Delta MCS_i$.

The FEC encoder 100 includes a fixed-rate Forward Error Correction such as convolutional, turbo, Low-Density Parity Check, or any other that operates independently over each input codeblock. It is then followed by a Rate Matching stage 110 that adjusts the amount of redundancy in each of the codeblocks in order to match the resulting block lengths with the available physical resources. Redundancy is determined by the actual MCS value to be applied on each codeblock, as opposed to prior art techniques where the same average MCS value is applied for all codeblocks.

The different MCS values to be applied over each codeblock will imply different coding rates and, eventually, different modulation schemes. However, and for ease of decoding, the size of the codeblocks prior to FEC encoding will be the same as when using a common average MCS value, and given by the codeblock segmentation module/means 90. Thus each codeblock will only differ in the amount of added redundancy after the FEC encoder 100 and Rate Matching 110. The total amount of encoded information in the whole packet will roughly be similar to the case of having a single average MCS value, as channel variations will be somewhat symmetric around the average, but in any case the differences shall be taken into account at the rate matching process as will be further explained.

A Codeblock Concatenation module/means 115 puts together all the encoded (and rate-matched) codeblocks that comprise the transmission. The Constellation Mapping module/means 120 then transforms them into complex samples from a suitable constellation, usually QPSK, 16QAM or other higher-order modulations, with possibly different modulations for each of the concatenated codeblocks depending on their MCS values. This is in contrast with prior art techniques where all complex symbols contained within the user payload usually have the same modulation order.

Figure 6:
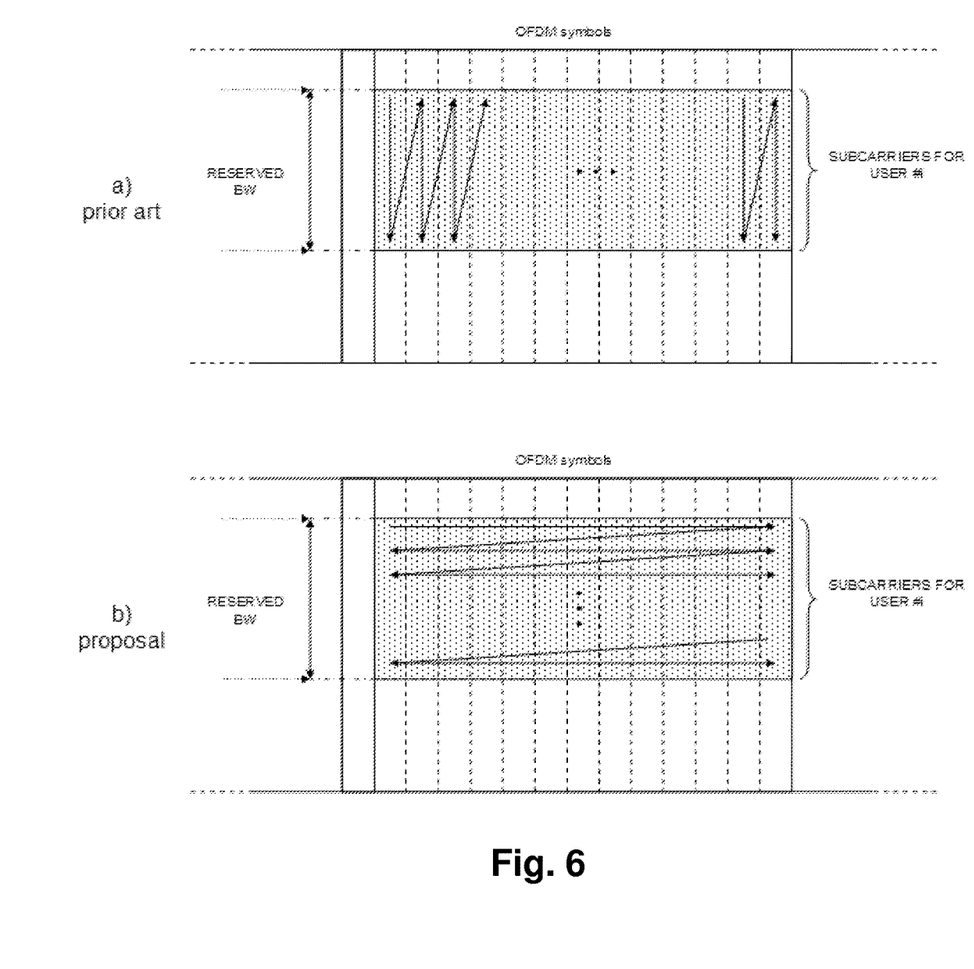
FIG. 6 is a comparison between a resource mapping technique in prior art techniques (a) and in the proposed invention (b).

The Physical Resources Mapping 130 then transforms complex symbols into actual subcarriers in the OFDM time-frequency grid. This invention proposes to perform the mapping function in horizontal order, from lower to higher OFDM symbols and from lower to higher subcarriers (as seen in FIG. 6), rather than in vertical order. Other prior art techniques sometimes perform the mapping in vertical order, from lower to higher subcarriers and from lower to higher OFDM symbols, as e.g. in LTE, to further increase frequency diversity. However this would conflict with the desire that each codeblock undergoes a given MCS corresponding to the frequency-domain channel characteristics. Given that the channel characteristics are usually estimated, and reported to the base station, over certain portions of the spectrum, and averaged over the OFDM symbols in the time domain, this invention performs the mapping in order that the MCS of each codeblock fits the corresponding frequency response. The subcarriers from the Physical Resources Mapping 130 are then fed into a OFDM Signal Generation 160 to generate an OFDM signal.

The proposed changes can coexist with the use of transmit or receive diversity antenna techniques, where two or more antennas cooperate in transmission or reception for increased diversity and robustness. Should any diversity scheme be applied, it would comprise the same operations upon transmission or reception irrespective of the actual encoding and modulation process in use. The only difference would be the increased quality generally perceived for each codeblock as a result of the diversity process; combined channel values would anyway be obtained from the additional antennas, and reported to the base station as in the single-antenna case.

An exception would be the case of using spatial multiplexing techniques, as e.g. in Multiple-Input Multiple-Output (MIMO) 2×2 or 4×4. In these cases the resulting qualities of the codeblocks depend fundamentally on the inter-stream interference that arises from the MIMO operation, which is difficult to predict at the base station on a codeblock basis. In addition, signaled $MCS_i$ values reported for each of the spatial streams would also suffer from inter-stream interference that could prevent correct detection of the whole packet. Therefore the proposed invention should not be used in MIMO spatial multiplexing and prior art encoding techniques should be employed instead.

With respect to the calculation of the MCS values, such MCS values to apply on each codeblock can be characterized by positive and negative increments around the average MCS, denoted in what follows as MCS incremental values, according to the expression:

$$MCS_i = MCS_{avg} + \Delta MCS_i.$$

The average MCS is always calculated in prior art techniques from the average channel quality and thus it is not covered by the present invention. Calculation of the incremental MCS values however requires knowledge of the channel frequency response prior to transmission. The situation differs in downlink and uplink directions.

In downlink direction the base station knows the channel frequency response either from reported channel quality indications sent by the terminals (in FDD mode) or by direct estimation from uplink signals (in TDD mode). In both cases the base station can perform variable-rate coding on a per-user and transmission basis as described in the present invention. Even a coarse granularity for the reported channel quality indicators may be sufficient to modulate the MCS values and thus exploit the variable channel characteristics.

However in uplink direction the user terminal would only know the channel frequency responses from direct estimation of downlink signals in TDD mode, or else from explicit channel quality reports sent by the base station in FDD mode. The latter is usually not contemplated in wireless cellular systems and thus a special procedure would have to be explicitly devised. It is therefore desirable that variable-rate encoding as proposed in the present invention is only applied in TDD mode for uplink direction, as in FDD a specific procedure should be devised for channel quality reporting from the base station to the users. In downlink however the changes can be applied both for FDD and TDD modes with no particular restrictions.

The average MCS value can be signaled as in prior art techniques by any suitable control indication. As an example, in LTE a Downlink Control Indication (DCI) contained in the Physical Downlink Control Channel (PD-CCH) carries the downlink and uplink scheduling assignments as well as the MCS format. However the incremental MCS values around the average MCS must be separately signaled to the users for appropriate decoding. These indications should be sent on a per-user basis, as each would receive different MCS values according to their perceived channels. The resulting signaling overhead can be significant when transmissions comprise a high number of codeblocks. Therefore it is proposed to include a special indication interspersed with user data, as further explained below.

It can be very onerous to signal the MCS incremental values $\Delta MCS_i$ on standard control channels devoted to the assignment of resources, especially for the cases of large system bandwidths and a high number of codeblocks per transmission. Therefore, it is proposed to include them as part of the data payload after suitable channel encoding.

Figure 7:
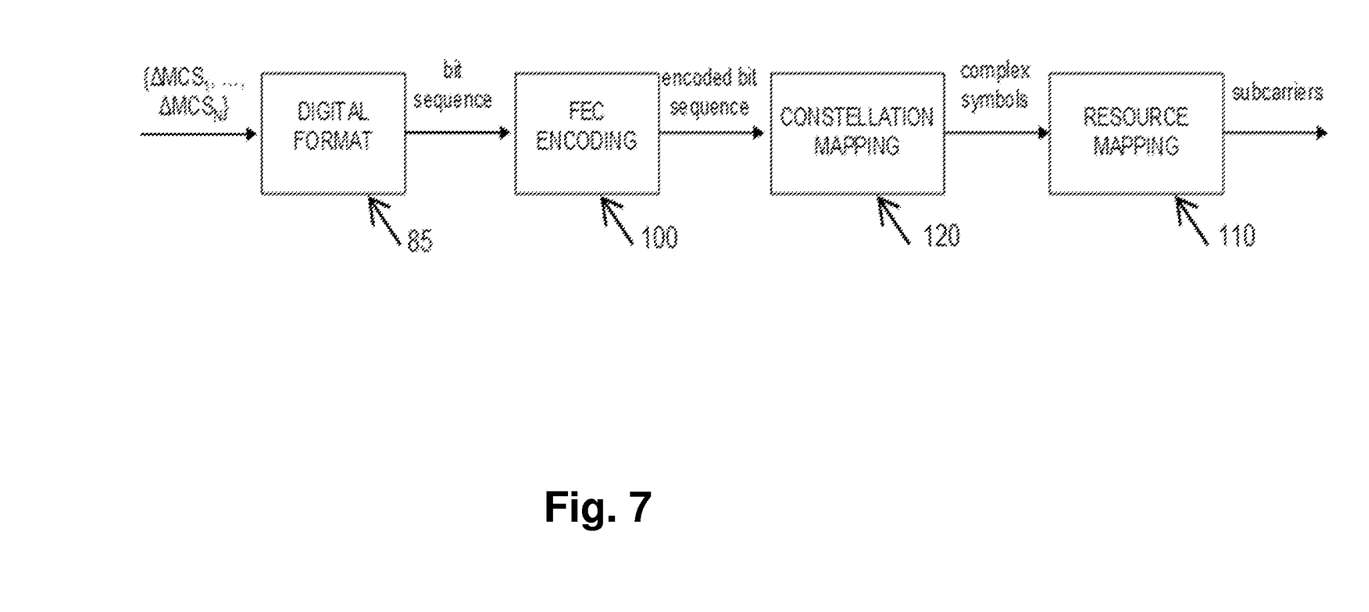
FIG. 7 illustrates the encoding and mapping method for the MCS incremental values.

FIG. 7 illustrates an embodiment of the proposed encoding and mapping method of the MCS incremental values for a given transmission. The set of values are first represented in suitable digital format with a given word length (that determines the maximum and minimum $\Delta MCS_i$ values), and then conveniently FEC-encoded for protection against channel impairments. FEC coding 100 should be very robust as any incorrectly detected values of $\Delta MCS_i$ would lead to a packet loss. Repetition or Reed-Muller coding, along with Walsh spreading, could be suitable for this case, as they are employed e.g. in LTE for the Physical HARQ Indicator Channel or PHICH; however any other suitable technique can also be employed. It is desirable that the resulting protection level of $\Delta MCS_i$ is similar to that of the MCS average value, in order to have similar robustness in the decoding of $MCS_{avg}$ and $\Delta MCS_i$.

After the FEC encoder 100, the Constellation Mapping module/means 120 transforms the digital information into complex symbols from a given constellation. Binary Phase Shift Keying (BPSK) modulation is desirable in this case for increased robustness, but other modulation orders can also be used depending on each implementation.

The resulting complex symbols are mapped along suitable subcarriers and OFDM symbols in the Resource Mapping 130, interspersing them with user data along time and frequency dimensions for increased diversity. A predefined mapping function can be devised along the allocated spectrum that exploits time and frequency diversity, skipping subcarriers reserved for purposes other than data, e.g. pilots, reference signals, synchronization signals, etc.

Figure 8:
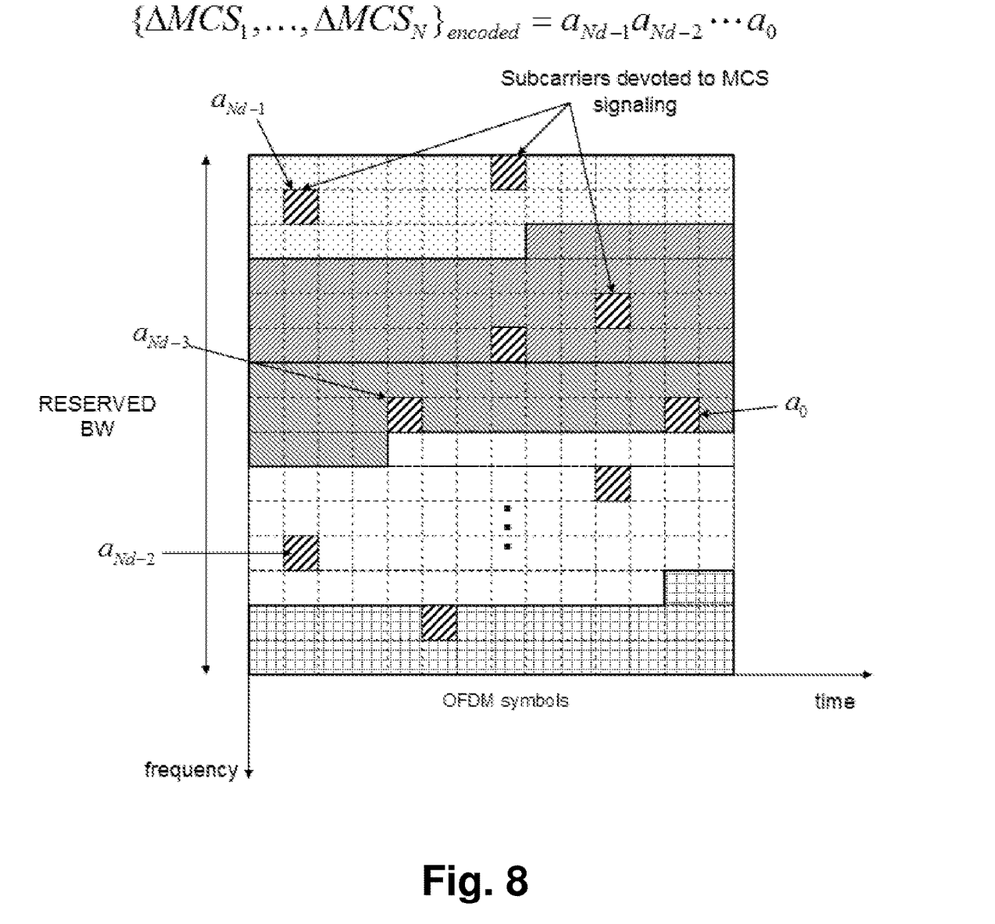
FIG. 8 is an example of a possible resource mapping scheme for the MCS indications.

FIG. 8 schematically illustrates a possible mapping of the signaling information that exploits frequency diversity by spreading the complex symbols throughout the bandwidth and OFDM symbols reserved for the user. Given N values of $\Delta MCS_i$, each of them requiring d complex symbols after FEC coding and constellation mapping, the set of N·d complex symbols can be suitably mapped over subcarriers exploiting frequency diversity as shown in the figure.

The details of the mapping function shall be known in advance by the users in order to locate the MCS indications prior to decoding the data. The number of codeblocks will be given by the transport block size (as appropriately signaled with prior-art techniques) and the codeblock segmentation function.

In case that any transmit diversity technique is applied (as e.g. Alamouti), it will also affect the MCS indications in such a way that the $\Delta MCS_i$ values undergo the same precoding operations as user data for the involved antennas.

Apart from signaling the MCS values, the base station shall deliver an indication to the user equipment when the proposed changes are applied through any suitable procedure, e.g. a special field within a resources assignment message or any other control message. Such control indication is outside the scope of the present invention.

The rate matching function, for the cases where it is applied as part of the encoding process, is modified with respect to prior art according to three principles:

Rate matching for each codeblock shall be variable and dependent on the actual MCS value that best fits the channel conditions. The codeblock lengths before FEC encoder 100 remain equal to the value obtained without application of the proposed invention, but after FEC encoder 100 and Rate Matching 110 the encoded block lengths will be different because of the variable added redundancy.

As a result of the variable-rate encoding of the codeblocks, the whole resulting packet length can be slightly different than without considering the proposed invention. This is due to the variable redundancy added or deleted from the encoded blocks as compared to the overall redundancy present in a fixed MCS scheme. The resulting differences shall be absorbed by the rate matching function in order to suit the available physical resources, with little impact on the overall coding rate as differences should be minimal.

Furthermore, the signaling indications for $\Delta MCS_i$ included within the space reserved for the payload leave less space available for data resources. The rate matching function shall take this into account when adjusting the sizes of the codeblocks after FEC encoder 100 to the available physical resources. However the impact will be negligible with practical codeblock sizes: e.g. in turbo coding a typical codeblock size of 3000 bits would be augmented with a $\Delta MCS$ indication of, say, 4 or 5 bits, which is completely negligible.

The proposed encoding scheme does not affect Hybrid Automatic Repeat Request (HARQ) operation as successive retransmissions will employ the same transport block sizes as the original transmission, thus leading to the same codeblock lengths prior to FEC encoder 100. The HARQ function controls retransmissions at MAC level. It is intimately related to the rate matching function as separate retransmissions undergo different redundancy versions (in incremental redundancy schemes), which in turn require different rate-matched blocks. The proposed invention can be used with HARQ adaptive retransmissions where MCS formats and frequency locations can be different upon each new retransmission, provided that each codeblock is always rate-matched independently from the others.

Figure 9:
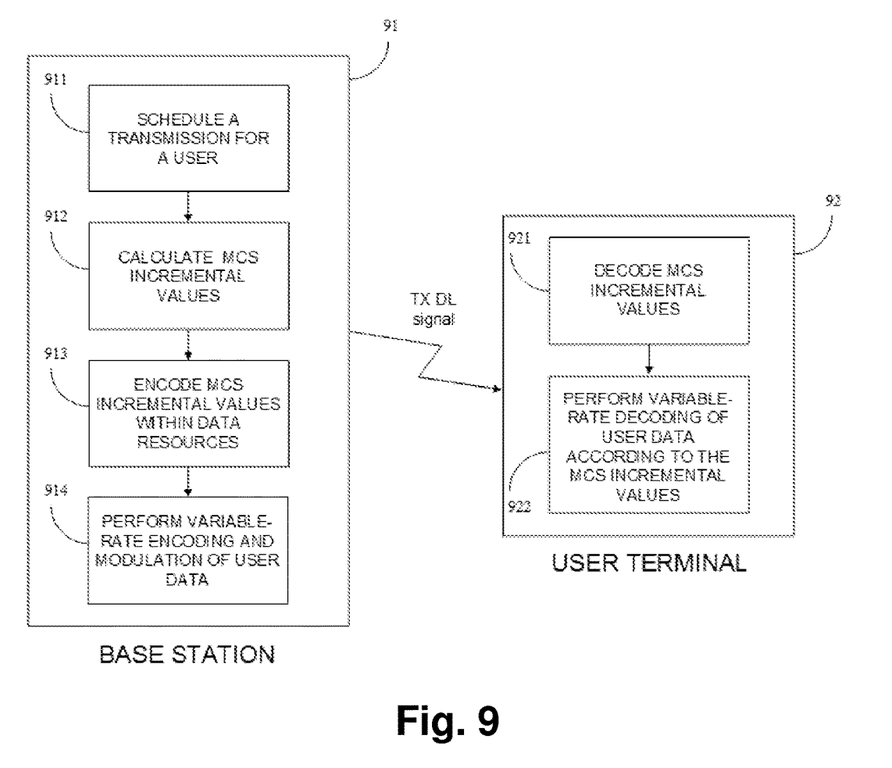
FIG. 9 illustrates an exemplary embodiment for the proposed invention in downlink direction.

With respect to FIG. 9 it is illustrated a preferred embodiment for the proposed invention in downlink direction, i.e. the transmitter being a base station. Assuming that a base station 91 activates the proposed encoding method for a given user, it schedules a transmission for a given user 911 and calculates the set of incremental MCS values 912 that best suits the channel characteristics for that user. The incremental MCS indications are included within physical resources reserved for user data 913, and variable-rate encoding and modulation is performed according to the present proposal 914. The user terminal 92 receives the downlink signal transmitted from the base station, and decodes the MCS incremental values corresponding to each codeblock 921. With such indications it can then perform variable-rate decoding of user data according to the detected MCS values 922.

Figure 10:
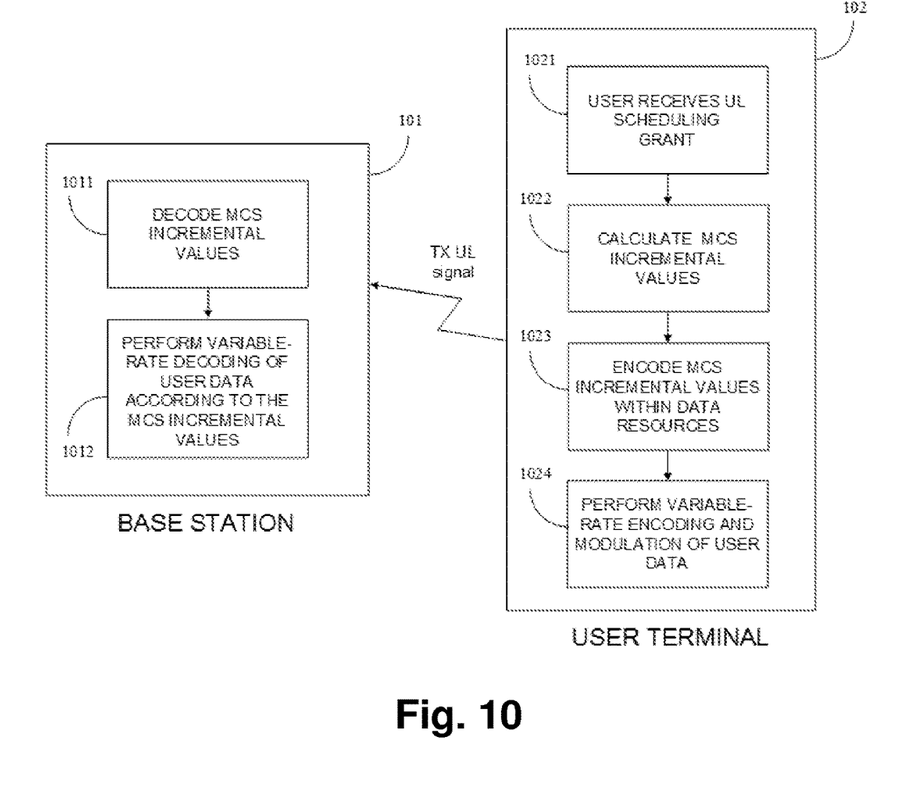
FIG. 10 illustrates an exemplary embodiment for the proposed invention in uplink direction.

With respect to FIG. 10 it is illustrated a preferred embodiment for application of the proposed invention in uplink direction, i.e. the transmitter being a user terminal. The user terminal 102 receives from the base station a suitable uplink scheduling grant 1021 indicating the allocated resources for uplink transmission. The MCS incremental values are calculated 1022 from the a-priori known uplink channel frequency response, and encoded within the resources reserved for data transmission 1023. The user terminal thus performs variable-rate encoding and modulation of user data 1024 as described in the present invention. The base station 101 receives the uplink signals, decodes the incremental MCS values 1011 and performs variable-rate decoding of the user data 1012.

Application of the proposed invention in both uplink and downlink is decided by the base station as part of the normal scheduling process, depending on the degree of user mobility, availability of channel frequency responses and amount of data to be served. A suitable control indication should also be sent to the user terminal whenever the proposed invention is applied for a given transmission, but such indication is outside the present invention.

Consequently, present invention exploits the availability of frequency-selective channel quality indications in order to better fit the encoded blocks that comprise a packet to the channel variations in the frequency domain. By fine-tuning the modulation and coding schemes separately for each of the blocks that comprise a transmission it is possible to match the channel variations much more precisely.

Current cellular systems devise link adaptation mechanisms that fit transmissions to the instantaneous channel variations in the time domain. However similar variations in the frequency domain are only exploited for scheduling decisions, not for efficient coding and modulation. Systems employing large bandwidths would benefit from the proposed variable-rate encoding and modulation technique, as in this case the channel coherence bandwidth would be much lower than the spectrum granted for each user. Channel variations would therefore be very significant in the frequency domain, and the encoded blocks comprising a transmitted packet would undergo large channel fluctuations around the average value. The proposed invention would better adjust the encoding and modulation process especially in good, static conditions with large bandwidths granted for a user. High-quality wireless services would thus benefit from lower error rates and a lower number of physical retransmissions.

The preferred embodiments can be applied to any OFDM wireless communications system, such as LTE, IEEE 802.11 (Wi-Fi) or IEEE 802.16 (WiMAX), not precluding other OFDM wireless technologies. Modifications to the described invention can be devised by people skilled in the art in order to adapt it to the specifics of each technology without departure from the fundamental ideas described here.

The proposed embodiments can be implemented as a collection of software elements, hardware elements, firmware elements, or any suitable combinations of them.

The scope of the present invention is defined in the following set of claims.

The invention claimed is:

1. A method for variable rate channel coding and modulation in a frequency domain of Orthogonal Frequency-Division Multiplexing (OFDM) wireless networks, the method comprising:
    partitioning, at a transmitter, user data into a plurality of codeblocks, each codeblock fitting input sizes accepted by Forward Error Correction (FEC);
    performing, at the transmitter, FEC on the codeblocks;
    applying, at the transmitter, a modulation and coding scheme (MCS) to each codeblock based on a channel frequency response received from a receiver of a channel over which the codeblock is to be transmitted, the MCS comprising a modulation order and a coding rate for the codeblock that best fits the channel frequency response of the channels;
    including, at the transmitter, information about the MCS applied to each codeblock within a part of physical resources devoted to the user data by reserving specific subcarriers and OFDM symbols for the information and inserting the information about the MCSs of the codeblocks into the reserved specific subcarriers and OFDM symbols; and
    mapping, at the transmitter, the modulated user data within the physical resources devoted to the user data and not reserved for the information about the MCSs, first in order of ascending OFDM symbols and then in order of ascending subcarriers.

2. The method of claim 1, wherein values of an MCS applied to a codeblock are given by the equation:

$$MCS_i = MCS_{avg} + \Delta MCS_i;$$

where $MCS_i$ denotes values of the MCS applied to the i-th codeblock, $MCS_{avg}$ is an MCS value applied to a whole transmission, and $\Delta MCS_i$ denotes differential MCS values with respect to the $MCS_{avg}$ to be applied to the i-th codeblock.

3. The method of claim 2, wherein the information about the MCSs comprises only the differential MCS values of the codeblocks.

4. The method of claim 3, further comprising encoding the differential MCS values through a Forward Error Correction method and further modulating the encoded differential MCS values using a constellation mapping function including at least a Binary Phase Shift Keying modulation that protects the encoded differential MCS values against channel impairments.

5. The method of claim 1, further comprising transmitting the mapped user data and included information about the MCSs,
wherein an allocated bandwidth for transmission is greater than a coherence bandwidth of the channel.

6. The method of claim 1, wherein the codeblocks have the same sizes prior to performing the Forward Error Correction.

7. The method of claim 6, comprising matching the sizes of the codeblocks after the FEC to available physical resources, and adjusting values of the MCS for each codeblock.

8. The method of claim 7, wherein the sizes of the codeblocks are adjusted after Forward Error Correction to reserve part of the available physical resources for the information on the MCSs applied to the codeblocks.

9. The method of claim 1, wherein the OFDM wireless network is a Long Term Evolution (LTE) network and the transmitter is a base station or a user terminal.

10. The method of claim 1, comprising applying transmit diversity to the mapped user data and included information about the MCSs.

11. The method of claim 1, wherein the channel frequency response is reported from the receiver to the transmitter in Frequency Division Duplex (FDD) mode, or directly estimated by the transmitter in Time Division Duplex (TDD) mode.

12. The method of claim 1, wherein application of the variable rate channel coding and modulation is signaled from a base station to a user terminal by a control message.

13. A transmitter for variable rate channel coding and modulation in a frequency domain of Orthogonal Frequency-Division Multiplexing (OFDM) wireless networks, the transmitter having knowledge of a channel frequency response as seen by the receiver and comprising a memory and at least one microprocessor that in operation with the memory is configured to:

partition user data into a plurality of codeblocks, each codeblock fitting input sizes accepted by Forward Error Correction (FEC);

perform FEC on the codeblocks;

apply a modulation and coding scheme (MCS) to each codeblock based on a channel frequency response received from a receiver of a channel over which the codeblock is to be transmitted, the MCS comprising a modulation order and a coding rate for the codeblock that best fits the channel frequency response of the channel;

include information about the MCS applied to each codeblock within a part of physical resources devoted to the user data by reserving specific subcarriers and OFDM symbols for the information and inserting the information about the MCSs of the codeblocks into the reserved specific subcarriers and OFDM symbols; and map the modulated user data within the physical resources devoted to the user data and not reserved for the information about the MCSs, first in order of ascending OFDM symbols and then in order of ascending subcarriers.

14. The transmitter of claim 13, wherein the at least one microprocessor is further configured to match sizes of the codeblocks after the Forward Error Correction to available physical resources.

* * * * *